Patented Nov. 22, 1949

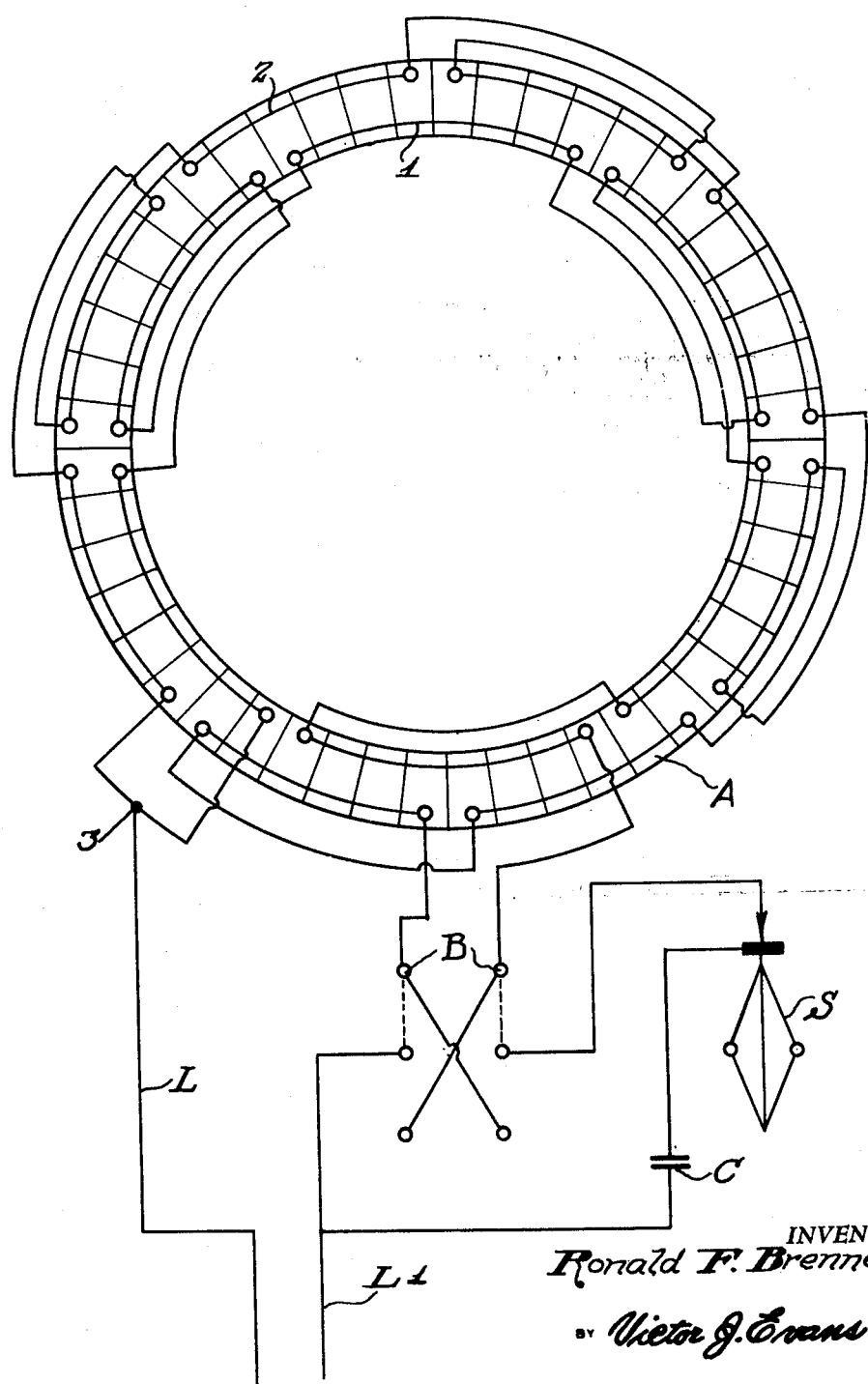

2,488,658

UNITED STATES PATENT OFFICE 2,488,658

MULTISPEED SINGLE-PHASE ELECTRIC MOTOR

Ronald F. Brennen, Jr., Brooklyn, N. Y.

Application May 18, 1948, Serial No. 27,636

2 Claims. (Cl. 318—224)

1

This invention relates to new and useful improvements in electric motors and more particularly and specifically to a simplified multi-speed, single phase motor.

The primary object of this invention resides in the provision of an electric motor which utilizes two running windings so placed relative to one another both electrically and physically so that they may be made to function either as a starting or running winding. This structure differs from presently known multi-speed motors which have two windings, a running and a starting, for each separate speed of the motor.

Another important object of this invention lies in the provision of a motor as set forth which: utilizes a high starting torque; does not depend on the load to regulate the speed; is suitable for belt drive arrangements; and which operates with a stable speed not varied voltage fluctuations. These advantages are a great improvement over present day multi-speed motors which have inherent low starting torques and which depend on the load for speed control with varied speeds fluctuating with the voltage.

Still a further and most important object of this invention is the provision of such a multi-speed motor which because of its simplicity of windings, pole structures, and control apparatus is rendered extremely simple and inexpensive to manufacture relative to the structures now in production.

Still further improvements and advantages of this invention will readily appear to those skilled in the art when the following description is read in the light of the accompanying drawings.

In the drawings

The single figure is a diagrammatic illustration of one practical embodiment of this invention.

Referring now to the accompanying drawing which illustrates the embodiment of the invention and in which like characters indicate similar parts throughout, A designates a slotted stator frame provided with a six pole winding 1 and an eight pole winding 2, each of which is so placed electrically and physically relative to the other so as to permit them to be employed as a starting or running winding, and both the six and eight pole windings are so connected that alternate poles are formed.

Both pole windings are connected on one side of the line L at 3, while they are each tied to different sides of a double throw, double pole switch B which is connected to the second side of the line $L_1$.

2

A capacitor C and a centrifugal switch S are connected in series on a parallel line between the line $L_1$ and the throw switch B.

The switch B controls the action of the two pole windings 1 and 2. When the double throw switch B is closed in one direction it places the eight pole winding 2 in series with the capacitor C and the centrifugal switch S thereby causing the eight pole winding 2 to function as a starting winding while the six pole winding 1 will function as the running winding. When a speed equal to a set percentage of the motor running speed has been reached the centrifugal switch S will kick-out leaving the motor running on the winding 1.

When the switch B is thrown to the opposite poles the converse of the aforementioned arrangement will occur. The six pole winding 1 will be tied in series with the capacitor B and the switch S to function as a starting winding, while the second pole winding 2 will function as the running winding and also providing a second speed arrangement for the motor.

Thus it can be readily seen that a multi-speed motor has been provided which has the inherent advantages as previously set forth. It may also be readily seen that this invention may be applied in concept to motors of any number of speeds. Additional speeds are made available by the mere addition of a single pole winding rather than the addition of two pole windings as has been heretofore necessary.

Having thus described and explained this invention what I desire to claim in Letters Patent is:

1. A multi-speed single phase motor comprising, a stator, two multi-pole running windings of different pole number, means connecting one end of both of said windings to one side of a power source circuit, a multi-pole multi-throw switch tied to the other side of the power source circuit, the other end of each of said windings being connected to separate poles of the throw switch, a capacitor and centrifugal switch connected in series between said other side of the power source line and the throw switch, and means whereby the multi-pole multi-throw switch is adapted to close one of the windings with the power source and at the same time tie the capacitor line in series with another of the windings for the purpose described.

2. A multi-speed single phase motor comprising a stator, two multi-pole running windings of different pole number, means connecting one end of both of said windings to one side of a power source circuit, switch means tied to the other side of the power source circuit, the other end of said windings being connected to said switch means, a capacitor and centrifugal switch connected in series between said other side of the power source line and said switch means, and means whereby the switch means is adapted to close one of the windings with the power source and at the same time tie the capacitor line in series with another of the windings for the purpose described.

RONALD F. BRENNEN, Jr.

REFERENCES CITED

The following references are of record in the file of this patent:

UNITED STATES PATENTS

| Number | Name | Date |
|---|---|---|
| 2,253,599 | Appleman et al. | Aug. 26, 1941 |
| 2,269,069 | Werner | Jan. 6, 1942 |